(12) United States Patent
Tange (10) Patent No.: US 9,358,484 B2
(45) Date of Patent: Jun. 7, 2016

(54) ROTATING SEPARATOR (71) Applicant: PurFil ApS, Odense S (DK)

(72) Inventor: Anders Tange, Odense S (DK)

(73) Assignee: Purfil ApS, Odense S (DK)

( * ) Notice: Subject to any disclaimer, the term of this patent is extended or adjusted under 35 U.S.C. 154(b) by 0 days.

(21) Appl. No.: 14/386,417

(22) PCT Filed: Mar. 19, 2013

(86) PCT No.: PCT/DK2013/050077
§ 371 (c)(1),
(2) Date: Sep. 19, 2014

(87) PCT Pub. No.: WO2013/139343
PCT Pub. Date: Sep. 26, 2013

(65) Prior Publication Data
US 2015/0076084 A1    Mar. 19, 2015

(30) Foreign Application Priority Data

Mar. 19, 2012  (DK) .................................. 2012 70121

(51) Int. Cl.
| | |
|---|---|
| *B01D 33/76* | (2006.01) |
| *B01D 37/04* | (2006.01) |
| *B30B 9/08* | (2006.01) |
| *B30B 9/16* | (2006.01) |
| *B01D 33/46* | (2006.01) |
| *B01D 29/35* | (2006.01) |
| *B30B 9/18* | (2006.01) |

(Continued)

(52) U.S. Cl.
CPC ............... *B01D 33/76* (2013.01); *B01D 29/35* (2013.01); *B01D 29/54* (2013.01); *B01D 29/6476* (2013.01); *B01D 29/828* (2013.01); *B01D 33/11* (2013.01); *B01D 33/39* (2013.01); *B01D 33/466* (2013.01); *B01D 33/648* (2013.01); *B01D 36/045* (2013.01); *B01D 37/04* (2013.01); *B01D 37/045* (2013.01); *B30B 9/08* (2013.01); *B30B 9/163* (2013.01); *B30B 9/18* (2013.01); *B01D 33/54* (2013.01)

(58) Field of Classification Search
None
See application file for complete search history.

(56) References Cited

U.S. PATENT DOCUMENTS

| | | | |
|---|---|---|---|
| 6,227,379 B1 | 5/2001 | Nesseth | |
| 6,395,187 B1 | 5/2002 | Alanis | |
| 2006/0021921 A1 | 2/2006 | Frommann | |
| 2015/0076084 A1* | 3/2015 | Tange | .................... B01D 33/11 |

FOREIGN PATENT DOCUMENTS

| | | |
|---|---|---|
| CA | 2107172 A1 | 3/1995 |
| DE | 19514596 A1 | 10/1996 |

(Continued)

*Primary Examiner* — Robert Popovics
(74) *Attorney, Agent, or Firm* — James Creighton Wray; Meera P. Narasimhan (57) ABSTRACT

A separator for separating solids from a slurry has a vibrating rotating container, rotatably connected to a support. The rotating container is provided with at least a first inlet and at least a first outlet and has at least one opening. A screw press is at least partly provided inside said rotating container. The screw press is arranged through said first outlet. The screw press has at least one hole. The at least one hole and a feed screw are provided inside said rotating container in continuation of said screw press. At least one lift paddle is provided inside said rotating container. A first part of the lift paddle is arranged along an inner surface of a side wall of said rotating container. A second part of said lift paddle is in contact with a part of the feed screw. A new method for separating slurry uses a separator.

11 Claims, 5 Drawing Sheets

(51) Int. Cl.
*B01D 36/04* (2006.01)
*B01D 33/39* (2006.01)
*B01D 29/54* (2006.01)
*B01D 29/64* (2006.01)
*B01D 33/64* (2006.01)
*B01D 33/11* (2006.01)
*B01D 29/82* (2006.01)
*B01D 33/54* (2006.01)

(56) References Cited

FOREIGN PATENT DOCUMENTS

| | | |
|---|---|---|
| GB | 874594 A | 8/1961 |
| GB | 886015 A | 1/1962 |
| JP | 7001195 A | 6/1995 |
| JP | 2002273114 A | 9/2002 |
| SU | 1386242 A1 | 4/1988 |
| WO | 9630102 | 10/1996 |

* cited by examiner

ROTATING SEPARATOR

This application claims the benefit of Danish Application No. PA 2012 70121 filed Mar. 19, 2012, and PCT/DK2013/050077 filed Mar. 19, 2013, International Publication No. WO 2013/139343, and the amended sheets from the IPRP, which are hereby incorporated by reference in their entirety as if fully set forth herein.

FIELD OF THE INVENTION

The present invention relates to a separator for separating solids from a slurry and a method for separating solids from a slurry.

BACKGROUND OF THE INVENTION

Separation of particles from a liquid is desirable in many cases for example for recycling purposes or for more efficient handling or processing of the separated components. One example could be the removal of solids from animal slurries.

Separation of solids from liquid is important for the use of animal waste slurries. Slurry can be used in biogas plants for obtaining energy. However, it is essential that the amount of dry matter in the slurry or the fraction of the slurry used in the biogas plant is as high as possible in order to be energetically feasible.

U.S. Pat. No. 6,227,379 describes a method and an apparatus for removal of solids from a slurry. The slurry is introduced into a rotating container. As the container rotates, lift paddles lift a portion of the slurry, allowing the liquid portion of the slurry to fall back into the slurry pool to be separated and lifting the solids towards the top of the container, where the solids by gravity slide into a collection tray for being transported out of the container.

The separation process as described in U.S. Pat. No. 6,227,379 separates solids from liquid matter by means of gravity alone. Therefore, the solid fraction still comprises a large amount of liquid, since a considerable amount of liquid will be retained by the fibres in the solid fraction.

OBJECT OF THE INVENTION

It is the object of the present invention to obtain an improved method for separation of slurry, where the solids and the liquid portion of the slurry are more efficiently separated.

DESCRIPTION OF THE INVENTION

This object is achieved by providing a separator for separating solids from a slurry comprising
  a rotating container comprising a side wall and two end walls where said rotating container is arranged on a support; where said rotating container is rotatably connected to said support;
  said rotating container is provided with at least a first inlet and at least a first outlet;
  said rotating container comprises at least one opening;
  a screw press being at least partly provided inside said rotating container, where said screw press is arranged through said first outlet and said screw press comprises at least one hole; said at least one hole preferably being provided on a part of said screw press being inside said rotating container;
  a feed screw being provided inside said rotating container in axial continuation of said screw press;
  at least one lift paddle being provided inside said rotating container, where a first part of said lift paddle is arranged along an inner surface of said side wall of said rotating container and a second part of said lift paddle is superposed at least a part of said feed screw.

By "slurry" is to be understood any kind of liquid comprising solids but preferably animal waste slurries and waste water. More preferably animal waste slurries and waste water having a particle size above 100 µm.

By "filtrate" is to be understood what is drained from the slurry or from any of the retentates during the separation process. Filtrate can be a mixture of the first and second filtrate, the first, second and third filtrate, the first, second, third and fourth filtrate, etc.

"At least a first filtrate" means that more than the first filtrate can be present, i.e. the first and second filtrate can be present, or the first, second and third filtrate can be present, etc.

By "retentate" is to be understood what is left from the slurry when filtrate has been drained off. Retentate can be a mix of the first and second retentate, the first, second and third retentate, the first, second, third and fourth retentate, etc.

The rotating container comprises a side wall and two end walls and is preferably cylindrically shaped. As an alternative embodiment, the container can have a cross-section substantially parallel to at least one of the end walls being a triangle, a square, a rectangle, a pentagon, a hexagon, etc.

A cylinder has a basic curvilinear geometric shape, the surface of which is formed by the points at a fixed distance from a given line segment, the axis of the cylinder. The solid enclosed by this surface and by two planes perpendicular to the axis is also called a cylinder. In this manner, a cylinder may have any suitable cross-sectional shape perpendicular to its axis, such as circular, oval, triangular, rectangular, square, etc.

The rotating container is connected to a support in a manner enabling the container to be able to rotate around an axis. In a preferred embodiment, the axis is defined by two connecting points where the rotating container is connected to the support.

In one embodiment, the rotating container rotates slowly for example 1-5 revolutions per min.

The rotating container can rotate either with a constant speed or rotate in intervals. When the slurry is relatively fluid, the constant rotation speed allows the liquid fraction enough time to be separated from the more solid fraction, whereas for other slurries, rotation in intervals will allow the slurry to drain liquid before being agitated (by the rotation) into a new position where more liquid may be drained off etc.

The support can be arranged on the ground for supporting and carrying the rotating container. In one embodiment, at least a part of the support is an H-section.

The rotating container comprises at least a first inlet. Through the first inlet the slurry is transported into the rotating container for separation. Each rotating container may comprise one, two, three or more first inlets. By having more first inlets the amount of slurry transported into the rotating container can be increased. Alternatively, slurry from different sources or feeding containers can be transported into the rotating container at one time.

In a further advantageous embodiment, the separator further comprises a feeding tank; said feeding tank being fluidly connected with said rotating container via said first inlet. The feeding tank can be a storage tank for containing animal waste slurry which is normally present at most farms. Alternatively, the feeding tank can be a collection tank whereto slurry is provided.

The rotating container comprises at least a first outlet. Through the first outlet the solids obtained from the slurry is removed from the rotating container. Each rotating container may comprise one, two, three or more first outlets. By having more first outlets the amount of solid transported from the rotating container can be increased.

The rotating container comprises at least one opening. Hereby is to be understood that one, two, three, four, five, six, etc. openings are provided in the rotating container. In a preferred embodiment, a plurality of openings is provided in the rotating container. The at least one opening can be provided in the side wall or/and one or two of the end walls. In one embodiment, a plurality of openings is provided in the side wall.

The at least one opening in the rotating container drains liquid in the form of a first filtrate from the slurry leaving solids in the form of a first retentate in the rotating container.

In one embodiment, the size of the at least one opening is equal to or below 40 μm.

In one embodiment, said rotating container is provided with a filter cloth. The filter cloth can be an edge filter or a cross-woven filter. Providing the rotating container with a filter cloth increases the process of separation. Furthermore, minor particles can be separated from the liquid part of the slurry by using a filter cloth.

A screw press is provided at least partly into said first outlet. The screw press presses (squeezes) the first retentate obtained from the slurry, whereby further liquid in the form of a second filtrate is removed from the first retentate. Hereby, the solid portion of the first retentate is increased leaving a second retentate.

As an example, the amount of dry matter in animal waste slurry prior to separation is approximately 5%. Separation by means of the rotating container increases the amount of dry matter in the first retentate to approximately 15% while the following separateon by means of the screw press increased the dry matter in the second retentate to approximately 30-40%.

In order for the second filtrate to be removed from the screw press, the screw press is provided with at least one hole. Hereby is to be understood that the screw press can be provided with one, two, three, four, etc. holes. In one embodiment, the screw press is provided with a plurality of holes.

In a further embodiment, the holes are provided on the part of the screw press arranged inside the rotating container. This is advantageous, since the second filtrate then automatically is drained from the rotating container due to the openings hereof in the same place where the first filtrate is drained. Thus, the first and second filtrates are mixed and can easily be collected in one batch. Furthermore, this saves energy in the process since no additional pumps are needed for transporting the second filtrate.

In one embodiment, ⅓ to ½ of the length of the screw press is arranged inside the rotating container.

In one embodiment, two or more screw presses are provided through two or more first outlets.

In one embodiment, the outer diameter of the screw press is 150 to 200 mm.

In a further embodiment, the turns of the screw press are degressively decreasing from 150 to 90 mm rotating in the pressurizing part of the screw press having a slit of 0.5-2.0 mm.

In one embodiment the screw press is operated by means of a counter pressure cone with a threaded rod.

Alternatively to the above means, in order to retain the material and increase or maintain the pressure in the screw press, a counter pressure snail which transports second retentate from the screw press may be provided, where said counter pressure snail is regulated by the torque of the screw press, i.e. increasing torque initiates the counter pressure snail until the torque is back to normal. The counter pressure snail may advantageously be perpendicularly arranged with respect to the screw press.

Alternatively, the retaining of material in the screw press is maintained by a spring regulated counter pressure cone, where speed of the screw press is controlled in order to maintain a constant torque.

A feed screw is provided inside the rotating container in continuation of the screw press. Hereby, is to be understood that the feed screw is connected with the screw press and that the feed screw is able to transport solids from the slurry in the form of the first retentate to the screw press for pressing of the first retentate. Alternatively, is to be understood that the screw press and feed screw is a combined mechanism for transporting and pressing the first retentate.

In one embodiment, the outer diameter of the feed screw is 150 to 200 mm.

The first retentate is transported to the feed screw by means of at least one lift paddle. Hereby, is to be understood that one, two, three, four, five, six, etc. lift paddles can be arranged inside the rotating container.

A first part of the at least one lift paddle is arranged along the inner surface of the side wall of the rotating container for being able to come into contact with the first retentate, which due to gravity is present at the lowest point of the inner surface of the side wall of the rotating container. The first retentate is lifted via the at least one lift paddle when the rotating container rotates and slides due to gravity onto the feed screw, since a second part of the at least one lift paddle is superposed the feed screw.

In one embodiment, the first and the second part of the lift paddle is opposite of one another.

The lift paddle can be of any shape which enables the first retentate to be effectively transported onto the feed screw. In one embodiment the free side of the paddle closest to the containers centreline is provided with a bend. In order to retain the lifted material long enough to ensure that as the paddle is tilted due to the rotation of the container, the material does not slide of the paddle until the paddle is superposed the funnel. The paddle may furthermore be made with a mesh structure whereby free liquid is allowed to drain off before the material enters the screw press. The mesh structure will also provide more friction whereby the material will have less tendency to slide of the paddle, before the paddle is superposed the funnel.

In one embodiment, the feed screw is a tube; said tube being open at the part of the first feed screw being connected with said blade and said tube being at least in some part of the tube perforated allowing additional drainage of first filtrate from the first retentate.

In one embodiment, a funnel is a part of the feed screw and receives the first retentate transported by the lift paddle.

In a further advantageous embodiment, said rotating container further comprises a spiral vane, said spiral vane is provided along said inner surface of said side wall of said rotating container.

By use of the spiral vane the first retentate can be moved along the inner surface of the side wall of the rotating container. The purpose of the spiral vane is to move the first retentate towards the at least one lift paddle in order for all of the first retentate to be moved onto the feed screw. Thus, the direction of the feed screw is towards the at least one lift paddle.

If the at least one lift paddle is not arranged next to one of the end walls, more spiral vanes are advantageously arranged in the rotating container for the first retentate to be transported towards the lift paddle from both sides.

Alternatively, the rotating container can be arranged in an inclined angle in order for the first retentate to be transported towards the lift paddle by means of gravity.

In a further advantageous embodiment, the rotating container further is provided with at least one asynchronous vibrating motor. Hereby, the rotating container is able to oscillate forwards and backwards with regard to the rotation of the rotating container. Thus, the filter cloth and/or the at least one opening of the rotating container can be mechanically rinsed. Hence, the separation process is not interrupted by clotting of the filter cloth and/or the at least one opening.

In one embodiment, the at least one asynchronous vibrating motor is provided at one of the end walls of the rotating container.

In a further embodiment, the asynchronous vibrating motors are provided at the two end walls of the rotating container. The same number of asynchronous vibrating motors is provided on each of the end walls of the rotating container.

In a further embodiment, four asynchronous vibrating motors are provided at each of the two end walls. Thus, the rotating container is provided with a total of eight asynchronous vibrating motors.

In a further embodiment at least one synchronous vibrating motor is provided connected to the rotating container. It is particularly preferred to use two synchronous motors arranged symmetrically around the axis around which the feed screw and other implements are arranged, and fastened to the end wall of the rotating container. By controlling the synchronous vibrations it is possible to impart vibrations having a relatively large amplitude to the container, and thereby exert substantial impact on the materials inside the rotating container, resulting in an increase in the separation, both with respect to lessen the process time in the container and with respect to handle more material at improved separation.

In a further embodiment, the rotating container is connected to the support by vibration absorbers. Hereby, the oscillations of the rotating container are not transmitted to the support. The vibration absorbers can for example be rubber or steel springs.

In a further advantageous embodiment, said separator further comprises a cover; said cover surrounds said rotating container. Hereby, the filtrate separated from the slurry and transported out of the openings of the rotating container is kept inside the cover and prevented from squirting from the rotating container.

In a further embodiment, the cover is a moisture-proof envelope, whereby oxidation and dehydration of the surfaces of the separator is reduced. Hereby, the rate of formation as well as the amount of struvite is heavily reduced.

In one embodiment, the cover is not rotating with the rotating container, but the rotating container rotates inside the cover.

In a further embodiment, the asynchronous or synchronous vibrating motors are provided inside the cover.

In a further advantageous embodiment, said separator further comprises a filtrate tank for collecting at least a first filtrate; said filtrate tank being fluidly connected with said rotating container. Hereby, at least the first filtrate can be collected and it is prevented that at least the first filtrate is just poured into the ground. Furthermore, the filtrate collected in the filtrate tank can be used for cleaning of the rotating container and pipes connecting for example the feeding tank and the rotating container as well as pipes connecting the filtrate tank and the rotating container.

The fluid connection between the rotating container and the filtrate tank can be a funnel directing the filtrate into the filtrate tank. Alternatively, the filtrate may just drip into the filtrate tank from the rotating container.

In a further embodiment, the fluid connection between the rotating container and the filtrate tank can be a pipe which is connected to the cover.

In a further embodiment, the cover comprising a funnel-shaped part; said funnel-shaped part is fluidly connected to the filtrate tank. The funnel-shaped part of the cover is advantageously arranged at the bottom of the cover. Hereby, the filtrate is due to gravity transported to the funnel-shaped part and further into the filtrate tank. All of the filtrate is thus drained optimally from the cover.

In a further embodiment, the cover comprises a closable outlet. Hereby, the transport of filtrate from the cover to the filtrate tank can be controlled.

In a further advantageous embodiment, said filtrate tank is fluidly connected to a hydrocyclone. In a still further advantageous embodiment, a hydrocyclone is fluidly connected to the cover.

A hydrocyclone is capable of separating very small solids from liquids and thus is able to separate small solids from the at least first filtrate resulting in a third retentate and a third filtrate. Hereby, a larger amount of solids can be purified from the slurry. The third retentate from the hydrocyclone contains elevated concentrations of phosphorous.

In one embodiment, solids down to 8 µm can be separated from the filtrate by means of the hydrocyclone.

A hydrocyclone is a device to classify, separate or sort particles in a liquid suspension based on the ratio of their centripetal force to fluid resistance. A hydrocyclone will normally have a cylindrical section at the top, where liquid is being fed tangentially, and a conical base. The angle, and hence length of the conical section, plays a role in determining operating characteristics.

A hydrocyclone has two exits on the axis: the smaller on the bottom (underflow or reject) and a larger at the top (overflow or accept). The underflow is generally the denser or coarser fraction, while the overflow is the lighter or finer fraction.

The third retentate from the hydrocyclone can be fed to the feed screw in order to be mixed with the first retentate through a second inlet. Hereby, larger solids in the first retentate will maintain the smaller solids from the third retentate. Alternatively, the third retentate can be collected separately.

The third filtrate can be mixed with at least the first filtrate by transporting the third filtrate into the rotating container through a third inlet.

Alternatively, the third filtrate can be mixed with at least the first filtrate by transporting the third filtrate into the cover through a third inlet.

Alternatively, the third filtrate can be collected separately.

In an advantageous embodiment, a material (mainly liquid) level transmitting mean is provided in said rotating container. The means for detecting/monitoring the level may for example be a radar or ultrasound device, but also mechanical means, such as a float on a detector arm may be used. Hereby, the functioning of the separator can be controlled since the level transmitting means is able to measure the level inside the rotating container and signal the result to other parts of the separator.

In this manner, the flow of slurry pumped into the rotating container can be controlled and regulated in order for the flow to match the process of separation, i.e. if the level inside the rotating container is high it is an indication that the material, in particular the liquid fraction, does not leave the container fast enough. This in turn is an indication that the holes in the container wall and/or the filter cloth need to be cleaned or replaced.

The level transmitting means in this manner helps to regulate the cleaning of the rotating container. A cleaning process can then automatically be started for removing the clotting of the rotating container or filter cloth by washing down the rotating container and the filter cloth by hosing using filtrate from either the filtrate tank or the cover. This process can be performed one or more times.

This invention further describes a method for separating solids from slurry using a separator as described above comprising the following steps:

a) introducing a slurry through a first inlet into a rotating container;
b) separating a first filtrate from a first retentate by means of said at least one opening being provided in said rotating container allowing said filtrate to escape the container and by rotating said rotating container around a rotation axis and transporting said first retentate along the inside surface of the rotating container to at least one lift paddle;
c) collecting said first filtrate;
d) transporting said first retentate onto a feed screw by means of said at least one lift paddle;
e) transporting said first retentate by means of said feed screw to a screw press;
f) pressing said first retentate by means of said screw press allowing a second filtrate to escape resulting in a second retentate and a second filtrate;
g) collecting said second filtrate with said first filtrate;
h) removing said second retentate from said screw press.

The slurry can be introduced into the rotating container at one of the ends or anywhere in between. Advantageously, the slurry is introduced in one of the ends in order to be transported along the entire length of the rotating container before being transported onto the feed screw. During the transportation along the rotating container the first filtrate is drained off the slurry, through at least one opening in the rotating container and leaves a first retentate to be lifted onto the feed screw by means of lift paddles.

The first retentate can be transported to the at least one lift paddle by means of gravity by arranging the separator in an inclined position. Alternatively, the first retentate is transported along the inside surface of said rotating container by means of a spiral vane.

The feed screw transport the first retentate under further drainage to the screw press where the first retentate is pressed into a second retentate and a second filtrate, which retentate can be removed from the screw press and used as for example compost.

Although the transport feed and screw and pressing screws are arranged co-axially in the container, their axles are not necessarily connected. The feed screw moves material from the funnel into the screw press. Due to the increased lead of the screw press' blades the material will be compacted. This effect is achieved as the transport screw creates a plug (either because it does not rotate or rotates substantially slower), whereby the material inside the press screw is compacted and the liquid fraction escapes through holes in the screw wall. When the torque on the axle of the screw press achieves a certain level the transport screw is activated removing at least a part of the plug, thereby relieving part of the pressure whereby new material can enter the screw press. The transport screw in this manner determines the pressure in the screw press (which is detected and measured as torque on the screw press axle). The transport screw may rotate constantly, albeit at different speeds in response to the torque on the screw press axle, or may operate intermittently, i.e rotate from time to time in order to remove (part of) the plug.

The first filtrate and the second filtrate are collected, preferably in the same batch.

Furthermore, the method comprises the steps of separating the first and second filtrate further into a third retentate and a third filtrate by means of a hydrocyclone and optionally mixing said third filtrate with said first and second filtrate and/or optionally mixing said third retentate with said first retentate.

In a further embodiment, the filtrate in the filtrate tank is recycled more time over the hydrocyclone. As an example, the filtrate can be recycled three times per batch of slurry separated. For each process of recycling a further retentate and filtrate is obtained, i.e. after a second time over the hydrocyclone a fourth retentate and a fourth filtrate is obtained, after a third time over the hydrocyclone a fifth retentate and a fifth filtrate is obtained, and so forth.

As an example, 50% of solids above 8 µm can be removed by each passing. If the filtrate is recycled for example 3-4 times this means that 90% of the small solids are removed.

When separating animal slurry, up to 60% of the phosphorous present in the slurry is maintained in the retentate after 3-4 recycles. Thus, the third filtrate is heavily reduced of phosphorous and can be used for distribution of manure in environmentally sensitive areas.

Furthermore, the method comprises a cleaning procedure, where said rotating container is rinsed by the following steps:

a) removing said first, second and optionally said third retentate from said rotating container;
b) adding an acid or a base to said first, second and optionally said third filtrate obtaining a cleaning liquid;
c) rinsing said rotating container at least one time with said cleaning liquid.

A CIP-procedure can be performed by using an acid. Before the procedure starts, retentate is removed from the separator by stopping the flow of slurry into the rotating container but maintaining the separation process for a while until all retentate has been removed from the rotating container. Then, a predetermined dose of acid is added to the filtrate present either in the cover or in a filtrate tank from an acid tank. Then, the rotating container is then washed down with the acidified filtrate. The washing down can be performed one or more times.

In a further embodiment, an additional CIP-pump can be provided together with a base tank for dosing a base to the filtrate. Hereby, the rotating container can be cleaned with both acid and/or base depending on the slurry to be separated.

DETAILED DESCRIPTION OF THE INVENTION

Figure 1:
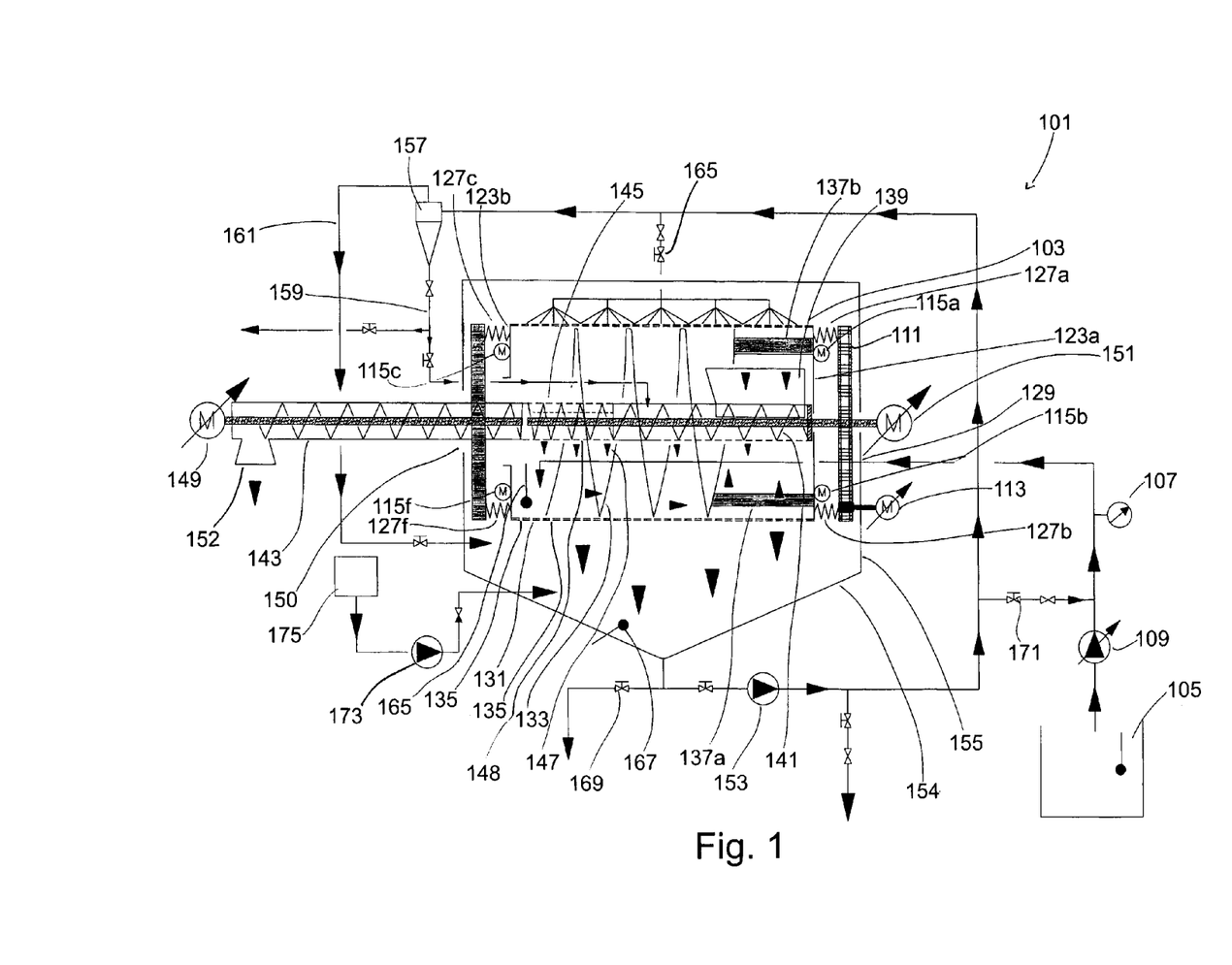
FIG. 1 illustrates a first embodiment of a separator.
Figure 2:
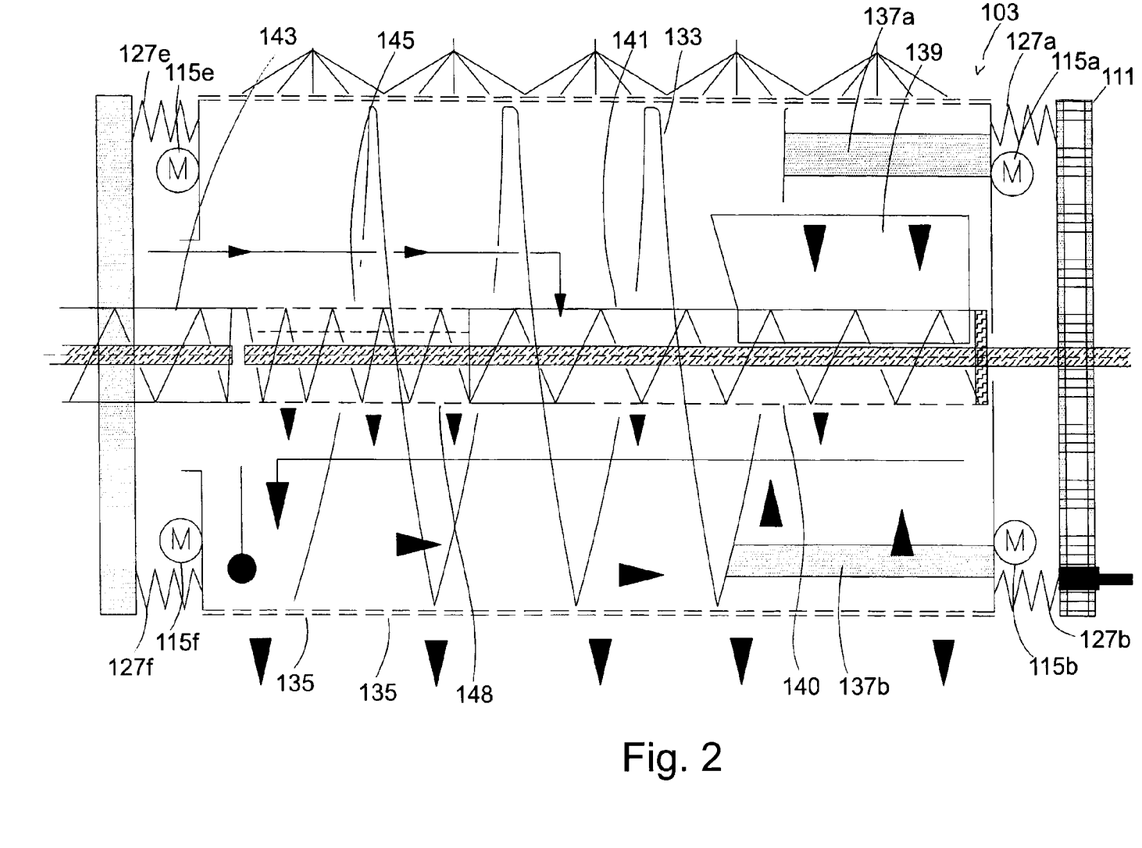
FIG. 2 illustrates a rotating container of a first embodiment of a separator.
Figure 3A:
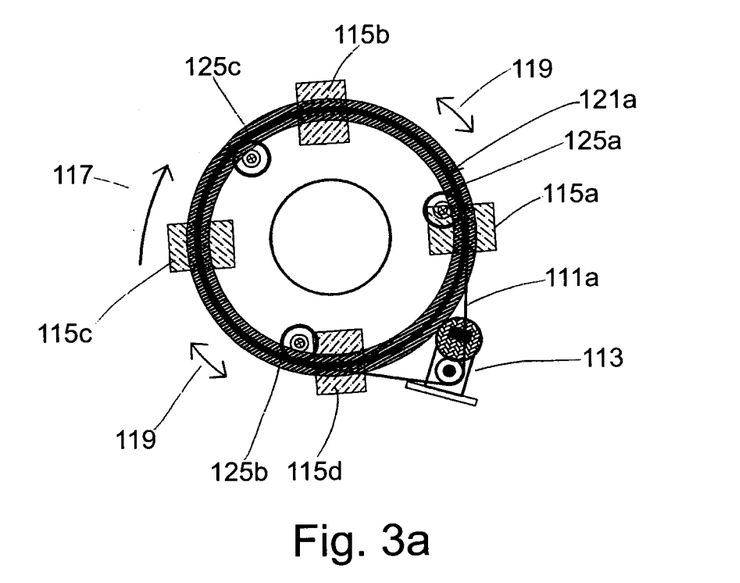
FIG. 3a illustrates a first end of a first embodiment of a separator.

FIGS. 1, 2 and 3a+b illustrates a first embodiment of a separator 101, where FIG. 1 illustrates the separator, while FIG. 2 is a close-up of the rotating container 103 and FIG. 3a+b illustrates the first and second end of the separator 101. Overall, the separator 101 can separate for example 3.000 liters per hour of raw manure, i.e. animal waste slurry. The slurry is pumped from for example a feeding tank 105 in a flow-determined frequency-controlled manner 107 by means of an eccentric screw slurry pump 109 to a rotating container 103.

The rotating container 103 is surrounded by a cover 155 which protects the rotating container 103. The bottom of the cover 154 is funnel-shaped for easier drainage of the filtrate from the cover 155.

The rotating container 103 rotates and is driven by a toothed belt 111, or in other embodiments by a gear rim, connected to a frequency-controlled belt or gear drive motor 113 optionally with gears which is located next to the rotating container 103.

Figure 3B:
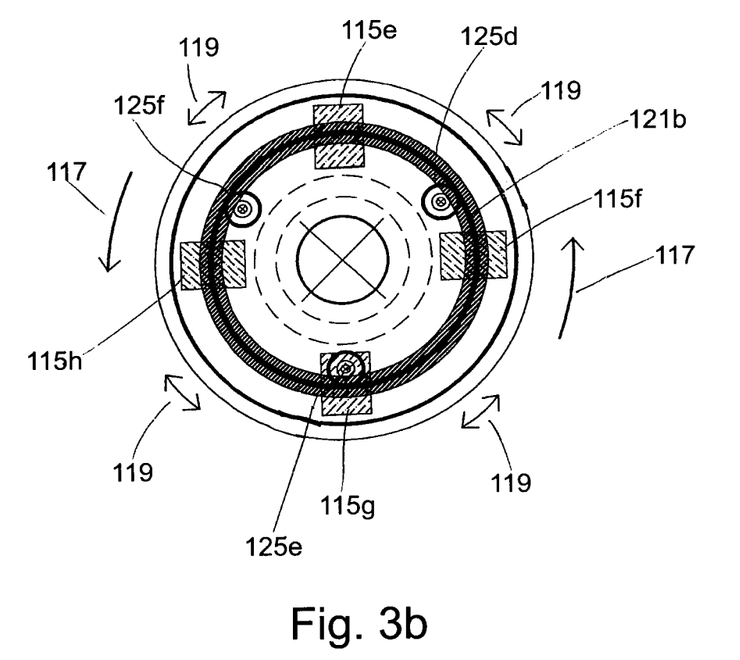
FIG. 3b illustrates a second end of a first embodiment of a separator.

Eight asynchronous vibrating motors 115a,b,c,d,e,f,g,h are mounted at each end of the rotating container 103. The asynchronous vibrating motors 115a,b,c,d,e,f,g,h cause the rotating container 103 to perform forward and backward movements (for example+/−6 mm) (see arrow 119 in FIG. 3a+b) in the direction of rotation 117 of the rotating container 103. This gives the same advantages as improved mechanical cleaning of the filter cloth, as in a traditional horizontal vibration sieve.

Although not illustrated an alternative embodiment has an arrangement of two synchronous vibrating motors arranged symmetrically about the rotating containers rotating axis. Naturally more synchronous motors may be arranged on the container as long as they are arranged symmetrically with respect to the rotation axis.

The rotating container 103 is mounted on a round H-section 121a,b at each end wall 123a,b. Rubber wheels 125a,b, c,d,e,f are mounted from the support (not shown) and run inside the H-section 121a,b. Where gear rims are used they may advantageously run on the outside. Outside the H-section 121a is the toothed belt mounted 111.

The H-section 121a,b is at at least one side provided with a track (slipring) for providing the asynchronous vibrating motors 115a,b,c,d,e,f,g,h with electricity.

The rotating container 103 is connected to the H-section 121a,b by means of vibration absorbers 127a,b,c,d,e,f,g,h (127c,d,g,h is not shown) such as rubber or steel springs to prevent oscillations from being transmitted from the rotating container 103 to the H-section 121a,b.

The slurry is feeded into the rotating container 103 through a first inlet 129. Along the inner surface of the side wall 131 of the rotating container 103, a spiral vane 133 is provided. Hereby, the rotation of the rotating container 103 directs the slurry from one end of the rotating container 103 to the other end under constant drainage, where a first filtrate exits the rotating container 103 through openings 135 herein. At the other end of the rotating container 103, a first retentate is transported by means of two lift paddles 137a,b into a funnel 139 and onto a feed screw 141. In this manner, the lift paddle 137a,b comes in contact with the funnel 139 which is a part of the feed screw 141. The feed screw 141 is a perforated tube 140 allowing additional drainage of liquid from the first retentate during transportation.

The first retentate is transported by the feed screw 141 into a screw press 145, where the first retentate is pressed/squeezed draining off a second filtrate 147 through holes 148 in the rotating container 103. During this press action, the material is pressed against the transport screw 143 which provides resistance and a plug builds up, providing the block against which the pressure in the screw press for squeezing the liquid out of the material. As pressure builds up in the screw press, the torque in the axle of the screw and feed screws builds up which may be measured in the motor 151. At a certain torque level, the transport screw 143 is activated, whereby the plug or at least part of the plug is removed and the torque lowered.

The separation process of the first retentate into a second retentate and a second filtrate is adjusted by the motor driven 149 retaining plate/cone of the transport screw 143. The transporting mechanism of the feed screw 141 and the screw press 143 is powered by a frequency controlled and torque registrating motor 151.

The screw press 143 is arranged partly inside the rotating container 103 through a first outlet 150 in the rotating container 103. A second outlet 152 is provided in the end of the transport press 143 allowing retentate to exit the transport screw 143.

The first and second filtrate is collected beneath the rotating container 103 in the cover (filtrate tank) 154. The filtrate can be recycled by means of the filtrate pump 153 through a hydrocyclone 157. In the hydrocyclone 157 small solids can be removed from the filtrate resulting in a third retentate 159 and a third filtrate 161. The third retentate can be directed to a separate collection or alternatively mixed with the first retentate at the feed screw 141.

The level of filtrate in the rotating container 103 is measured using a direct analogue transmitter 163, for example ultrasound or radar to control the speed of pumping slurry into the rotating container 103. If the incoming flow of slurry increases above a defined setpoint, a first valve opens 165 and the rotating container 103 is washed down with filtrate obtained from the cover 154. The washing down process can be performed one or more times. If the level of filtrate is not reduced or if it increases to a higher setpoint, the washing down process changes to a cleaning process using acid or base using a CIP-procedure (Clean In Position).

A CIP-procedure can be performed by using either an acid or a base. Before the procedure starts, retentate is removed from the separator 101 by stopping the introduction of slurry into the rotating container 103 but maintaining the separation of the slurry already present in the rotating container 103 until all retentate has been removed from the rotating container 103. Hereafter, the feed screw 141, screw press 145 and transport screw 143 are stopped. By means of the CIP-pump 173, a predetermined dose of acid is added to the filtrate from an acid tank 175. The rotating container 103 is then washed down with the acidified filtrate. The washing down can be performed one or more times.

When the level of filtrate in the cover 154 exceeds a given setpoint as measured by a level transmitter 167, a third outlet 169 is opened whereby the filtrate is passed to a filtrate tank.

By breakdown of the separation process, the feeding of slurry to the rotating container 103 is stopped by stopping the pump 109, where after the filtrate pump 153 pumps filtrate for washing down the feeding tubes by opening a second valve 171. The feeding tubes are washed down from the feeding pump 109 to the rotating container 103. This prevents sedimentation of solids in the feeding tubes due to lack of flow in the tubes.

In FIG. 1 and FIG. 2, the arrows illustrate the flow of the slurry, the retentates, the filtrates and the acid.

Figure 4:
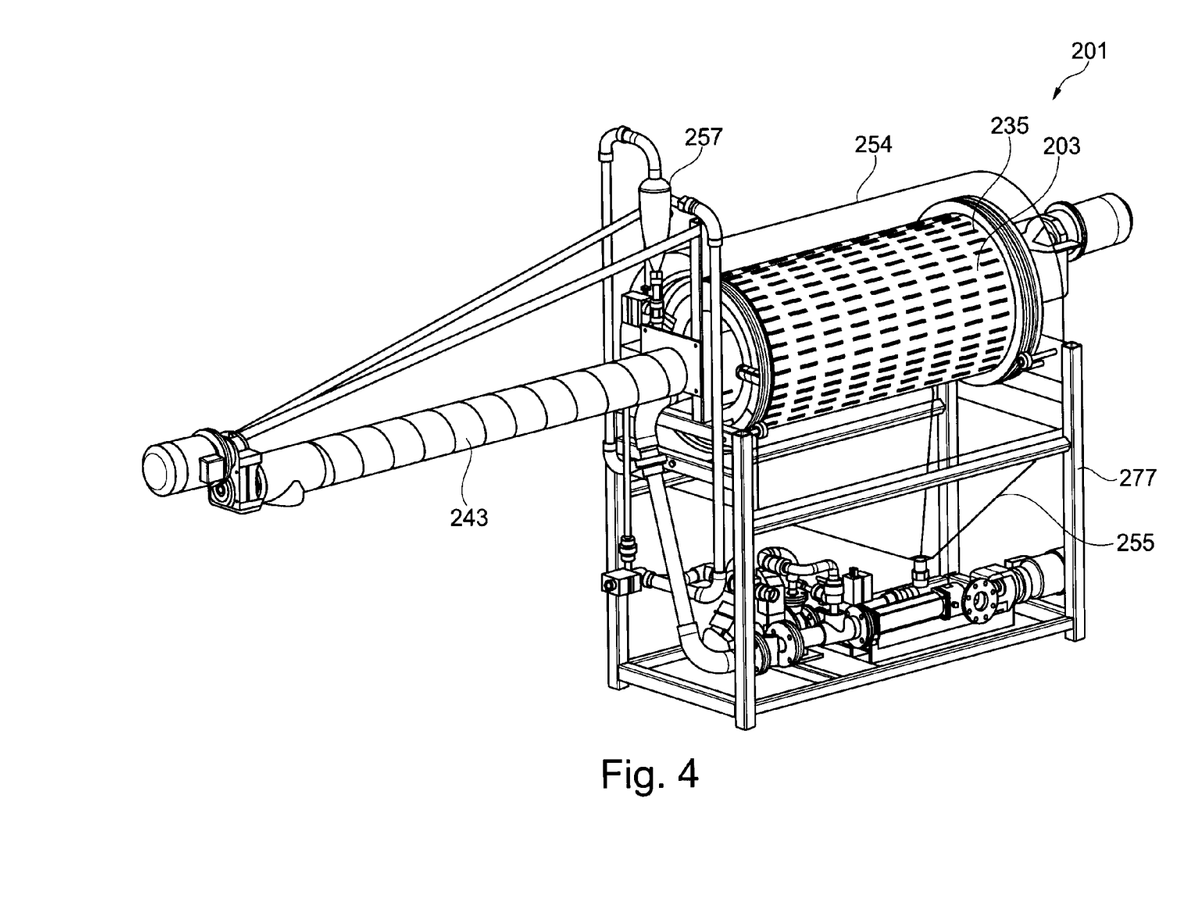
FIG. 4 illustrates a three-dimensional view of a second embodiment of a separator.
Figure 5:
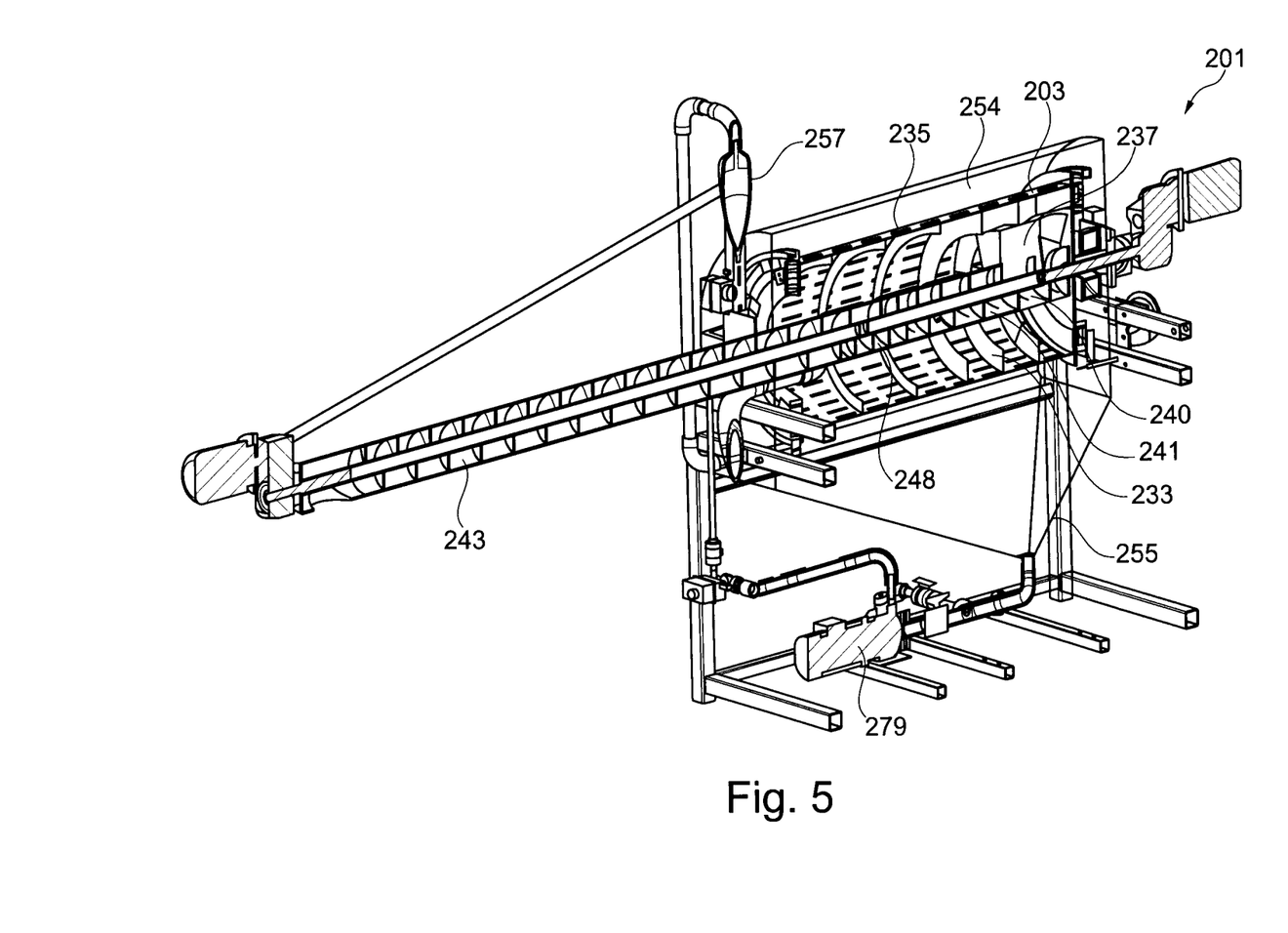
FIG. 5 illustrates a cross-sectional view of a second embodiment of a separator.

FIGS. 4 and 5 illustrate a second embodiment of a separator 201, where the separator 201 includes a support 277 and a filtrate tank 255 as well as a pump 279 for pumping said filtrate.

The rotating container 203 is connected to the support 277 enabling the rotating container 203 to rotate around an axis substantially parallel with the screw press 241. During rotation, a first filtrate is drained through openings 235 of the rotating container 203 and moved via the spiral vane 233 towards the lifting paddle 237, where a first retentate is transported into the screw press 241 and further to the transport screw 243. Perforations 240 in the feed screw 241 allow further drainage of the first retentate during transportation towards the screw press 243. Holes 248 in the screw press 241 allow the second filtrate to be drained from the first retentate leaving the second retentate in tate in the screw press 241.

Furthermore, the separator 201 is provided with a hydrocyclone 257 for further purification of at least the first and second filtrate.

The invention claimed is:

1. A separator for separating solids from a slurry comprising
- a rotating container (103, 203) comprising a side wall (131) and two end walls (123*a*, 123*b*) where said rotating container (103, 203) is arranged on a support; where said rotating container (103, 203) is rotatably connected to said support;
- said rotating container is provided with at least a first inlet (129) and at least a first outlet (150);
- said rotating container (103, 203) comprises at least one opening (135);
- a feed (141) and screw press (145) being at least partly provided inside said rotating container (103, 203), where said feed (141, 241) and screw press (145) is arranged through said first outlet (150) and said screw press (145) comprises at least one hole; said at least one hole (148, 248) being provided on a part of said screw press (145) being inside said rotating container (103, 203);
- at least one lift paddle (137*a*, 137*b*, 237) being provided inside said rotating container (103, 203), where a first part of said lift paddle is arranged along an inner surface of said side wall (131) of said rotating container (103, 203) and a second part of said lift paddle is superposed at least a part of said feed screw (141, 241) wherein
- an independent transport screw (143, 243) is arranged coaxially with said feed (141, 241) and press screws (145, 245), where said transport screw (143) is controlled independently from said screw press (145) on the basis of the torque measured on the screw press axle.

2. The separator according to claim 1, wherein said rotating container (103, 203) further comprises a spiral vane (133, 233), said spiral vane is provided along said inner surface of said side wall (131) of said rotating container (103, 203).

3. The separator according to claim 1, wherein said rotating container (103, 203) further is provided with at least one asynchronous vibrating motor (115*a*-115*h*).

4. The separator according to claim 1, wherein said rotating container (103, 203) further is provided with at least one synchronous vibrating motor.

5. The separator according to claim 1, wherein said separator further comprises a cover (154); said cover surrounds said rotating container (103, 203).

6. The separator according to claim 5, wherein said filtrate tank (155, 255) is fluidly connected to a hydrocyclone (157, 257).

7. The separator according to claim 1, wherein said separator further comprises a filtrate tank (155, 255) for collecting at least a first filtrate; said filtrate tank (155, 255) being fluidly connected with said rotating container (103, 203).

8. The separator according to claim 1, wherein a pressure/level transmitting means (163) is provided in said rotating container (103, 203).

9. A method for separating solids from slurry using a separator as described in claim 1 comprising the following steps:
    a) introducing a slurry through a first inlet (129) into a rotating container (103, 203);
    b) separating a first filtrate from a first retentate by means of said at least one opening being (135) provided in said rotating container (103, 203) allowing said filtrate to escape the container (103, 203) and by rotating said rotating container (103, 203) around a rotation axis and transporting said first retentate along the inside surface (131) of the rotating container (103, 203) to at least one lift paddle (137*a*, 137*b*, 237);
    c) collecting said first filtrate;
    d) transporting said first retentate onto a feed screw (141, 241) by means of said at least one lift paddle (137*a*, 137*b*, 237);
    e) transporting said first retentate by means of said feed screw (141, 241) to a screw press (145, 243);
    f) pressing said first retentate by means of said screw press (145, 243) allowing a second filtrate to escape resulting in a second retentate and a second filtrate;
    g) collecting said second filtrate with said first filtrate;
    h) removing said second retentate from said screw press (145, 243).

10. The method according to claim 9, where said first and second filtrates are further separated into a third retentate and a third filtrate by means of a hydrocyclone (157, 257) and optionally mixing said third filtrate with said first and second filtrate and/or optionally mixing said third retentate with said first retentate.

11. The method according to claim 9, where said rotating container (103, 203) is rinsed by the following steps:
    a) removing said first, second and optionally said third retentate from said rotating container;
    b) adding an acid or a base to said first, second and optionally said third filtrate obtaining a cleaning liquid;
    c) rinsing said rotating container at least one time with said cleaning liquid.

* * * * *